United States Patent
Suzuki

(10) Patent No.: US 10,033,883 B2
(45) Date of Patent: Jul. 24, 2018

(54) IMAGE FORMING SYSTEM

(71) Applicant: KYOCERA Document Solutions Inc., Osaka-shi, Osaka (JP)

(72) Inventor: Atsushi Suzuki, Osaka (JP)

(73) Assignee: KYOCERA DOCUMENT SOLUTIONS INC., Osaka-Shi, Osaka (JP)

( * ) Notice: Subject to any disclaimer, the term of this patent is extended or adjusted under 35 U.S.C. 154(b) by 0 days.

(21) Appl. No.: 15/607,736

(22) Filed: May 30, 2017

(65) Prior Publication Data
US 2017/0346958 A1 Nov. 30, 2017

(30) Foreign Application Priority Data

May 30, 2016 (JP) .................................. 2016-107293

(51) Int. Cl.
| | |
|---|---|
| H04N 1/00 | (2006.01) |
| G06F 3/12 | (2006.01) |
| H04L 29/08 | (2006.01) |

(52) U.S. Cl.
CPC ....... H04N 1/00206 (2013.01); G06F 3/1204 (2013.01); H04L 29/08198 (2013.01); H04N 1/00204 (2013.01); G06F 3/1296 (2013.01)

(58) Field of Classification Search
CPC .......................... H04N 1/00206; G06F 3/1204
See application file for complete search history.

(56) References Cited

U.S. PATENT DOCUMENTS

| | | | | |
|---|---|---|---|---|
| 4,512,033 | A * | 4/1985 | Schrock | H04L 12/2801 340/3.51 |
| 5,745,381 | A | 4/1998 | Tanaka et al. | |
| 7,542,159 | B2 * | 6/2009 | Yamada | G06F 3/1205 358/1.13 |
| 8,127,230 | B2 * | 2/2012 | Hirayama | H04N 1/0044 358/1.9 |
| 8,502,997 | B2 * | 8/2013 | Chae | G06F 3/1205 358/1.13 |

FOREIGN PATENT DOCUMENTS

| | | |
|---|---|---|
| JP | H08-77220 A | 3/1996 |
| JP | 2000122827 A | 4/2000 |
| JP | 2010026316 A | 2/2010 |

* cited by examiner

*Primary Examiner* — Ibrahim Siddo
(74) *Attorney, Agent, or Firm* — Viering, Jentschura & Partner mbB

(57) ABSTRACT

An image forming system includes a multifunction peripheral in which a setting related to image forming is variable and a plurality of mobile terminal devices that are communicable with the multifunction peripheral. The multifunction peripheral includes an adjustment unit and an image forming setting control unit. The adjustment unit adjusts, based on a plurality of requests for adjustment of the setting related to image forming, which have been received by a multifunction peripheral communication unit, the setting related to image forming. The image forming setting control unit performs control such that the setting related to image forming, which has been adjusted by the adjustment unit, is reflected.

6 Claims, 14 Drawing Sheets

IMAGE FORMING SYSTEM

CROSS-REFERENCE TO RELATED APPLICATION

This application claims priority to Japanese Patent Application No. 2016-107293, which was filed May 30, 2016, and is incorporated herein by reference in its entirety.

BACKGROUND

This disclosure relates to an image forming system.

In an image forming apparatus, which is typified by a multifunction peripheral, a photoreceptor is irradiated with light, based on image data, to form an electrostatic latent image on the photoreceptor. Thereafter, a charged toner is fed onto the formed electrostatic latent image to form a visible image. Then, after the toner is transferred to a sheet of paper, the toner is fixed onto the sheet of paper. The sheet of paper onto which the toner has been fixed is discharged to the outside of the apparatus.

As for image forming apparatuses which are installed in offices, such an image forming apparatus is coupled to a network in a viewpoint of sharing the image forming apparatus by a plurality of users. Then, image data is transmitted and also a request for forming an image is issued from a computer installed at a desk of each user via the network, and then, printing is performed in the image forming apparatus. A technology related to an operation for a device of a user has been conventionally known.

Conventionally, a method for evaluating operability at the time of completion of a device in a design stage has been known. The known method for evaluating the operability includes a function-operation correspondence table creating step of creating a function-operation correspondence table that indicates, for all of functions that a device eventually has at the time of completion, an operation part that is to be operated in order for a user (an operator) of the device to cause the function of the operation part to be executed and a necessary number of times an operation is to be performed for each operation part, an operation number detection step of obtaining, when each of all of the functions is caused to be executed once, the number of times an operator of the device performs an operation for each operation part using the created function-operation correspondence table, an operation number totaling step of totalizing the number of times of an operation has been performed for each operation part, an operation ratio calculation step of calculating, for each operation part, the ratio of the number of times of an operation has been performed for the each operation part to the total of the number of times an operation has been performed for all of the operation parts, a deviation operation detection step of detecting, for each operation part, deviation of the number of times the user has performed the operation of each operation part, based on the operation ratio of the each operation part and the number of the operation parts, and an operability evaluation step of evaluating, based on the deviation of the number of times the user has performed the operation of each operation part, which has been detected, the operability of the device.

Conventionally, a printer selection method for selecting a desired printer from a plurality of printers coupled to a network has been known. The known printer selection method includes acquiring functions and operation states of the plurality of printers, calculating, based on the acquired functions and operation states, the degree of priority of each of the plurality of printers, and creating, based on the calculated degree of priority, a list of the plurality of printers to display the list. Furthermore, in the printer selection method, the degree of priority is determined in consideration of weight information that is determined by a result of a survey conducted to a user in advance.

Also, a typical image forming apparatus is an image forming apparatus that is capable of notifying, when a failure occurs in a function unit provided for forming an image, a management device located in a remote area of information of the failure. Such a typical image forming apparatus includes a failure detection analysis unit that detects a failure and identifies the type of the failure, a service level setting unit that sets, in accordance with a request of a user, a plurality of service levels used for selecting the type of the failure which occurs in the function unit and the information of which a management device is notified when the failure occurs, and a failure information notifying unit that notifies the type of the failure, based on the service level.

SUMMARY

An image forming system according to the present disclosure includes an image forming apparatus in which a setting related to image forming is variable and a plurality of external devices that are communicable with the image forming apparatus. Each of the external devices includes a request receiving unit and an external device transmission unit. The request receiving unit receives a request for adjustment of the setting related to image forming from a user. The external device transmission unit transmits the request for adjustment of the setting related to image forming, which has be received by the request receiving unit to the image forming apparatus. The image forming apparatus includes an image forming unit configure to form an image, an image forming apparatus receiving unit, an adjustment unit, and an image forming setting control unit. The image forming apparatus receiving unit receives requests for adjustment of the setting related to image forming, which have been transmitted from the plurality of external device transmission units. The adjustment unit adjusts, based on the plurality of requests for adjustment of the setting related to image forming, which have been received by the image forming apparatus receiving unit, the setting related to image forming. The image forming setting control unit performs control such that the setting related to image forming, which has been adjusted by the adjustment unit, is reflected.

DETAILED DESCRIPTION

Figure 1:
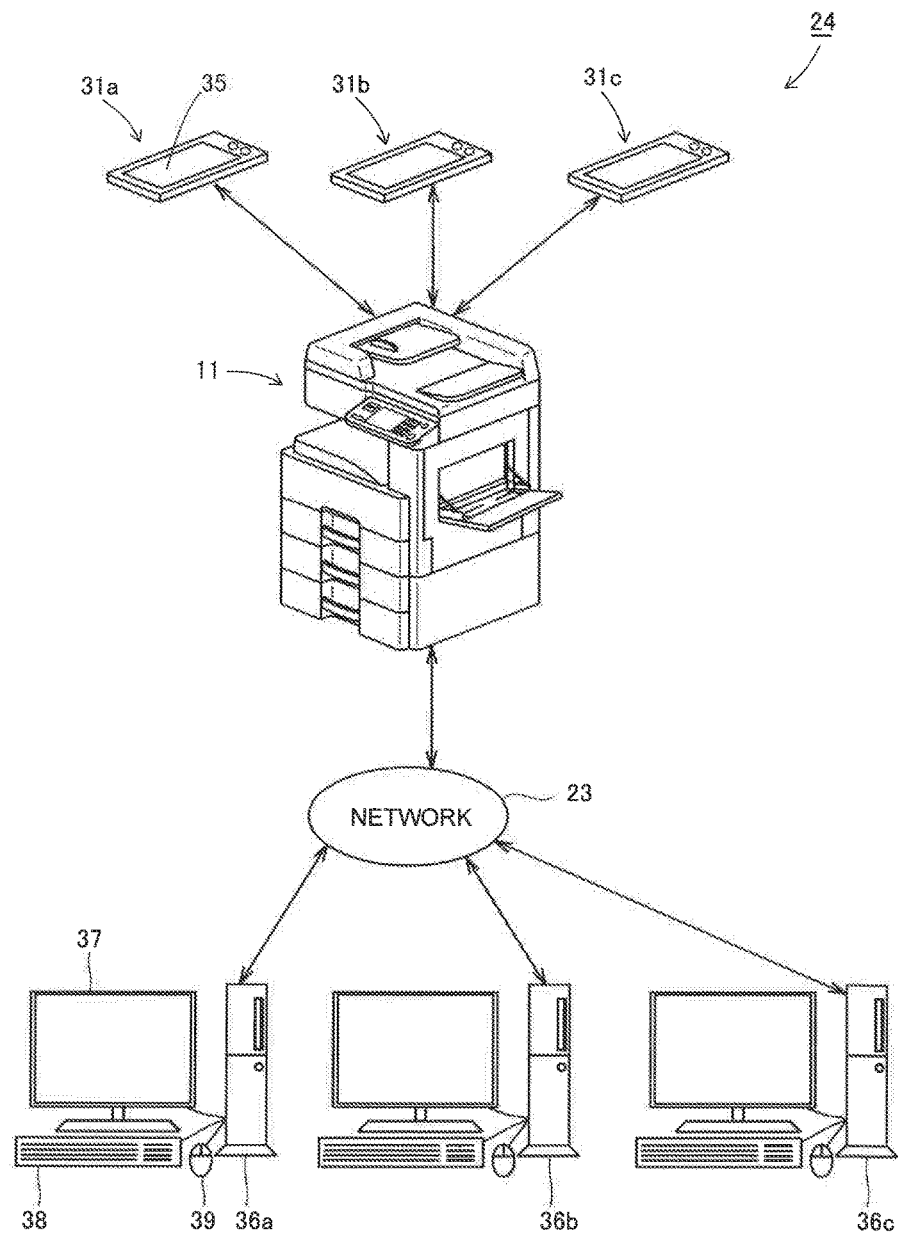
FIG. 1 is a schematic view illustrating an outer appearance of an image forming system according to an embodiment.
Figure 2:
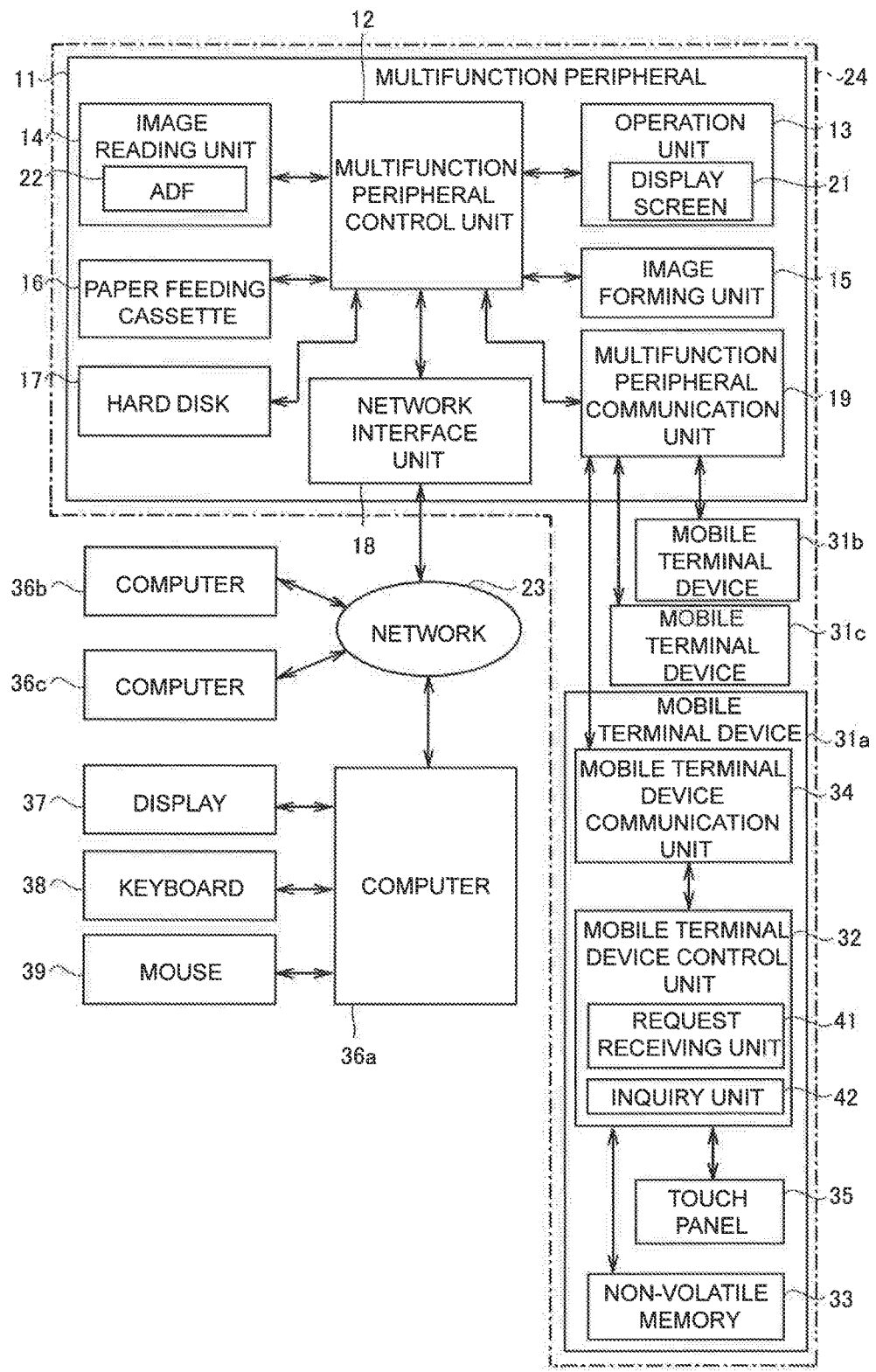
FIG. 2 a block diagram illustrating a configuration of the image forming system illustrated in FIG. 1.
Figure 3:
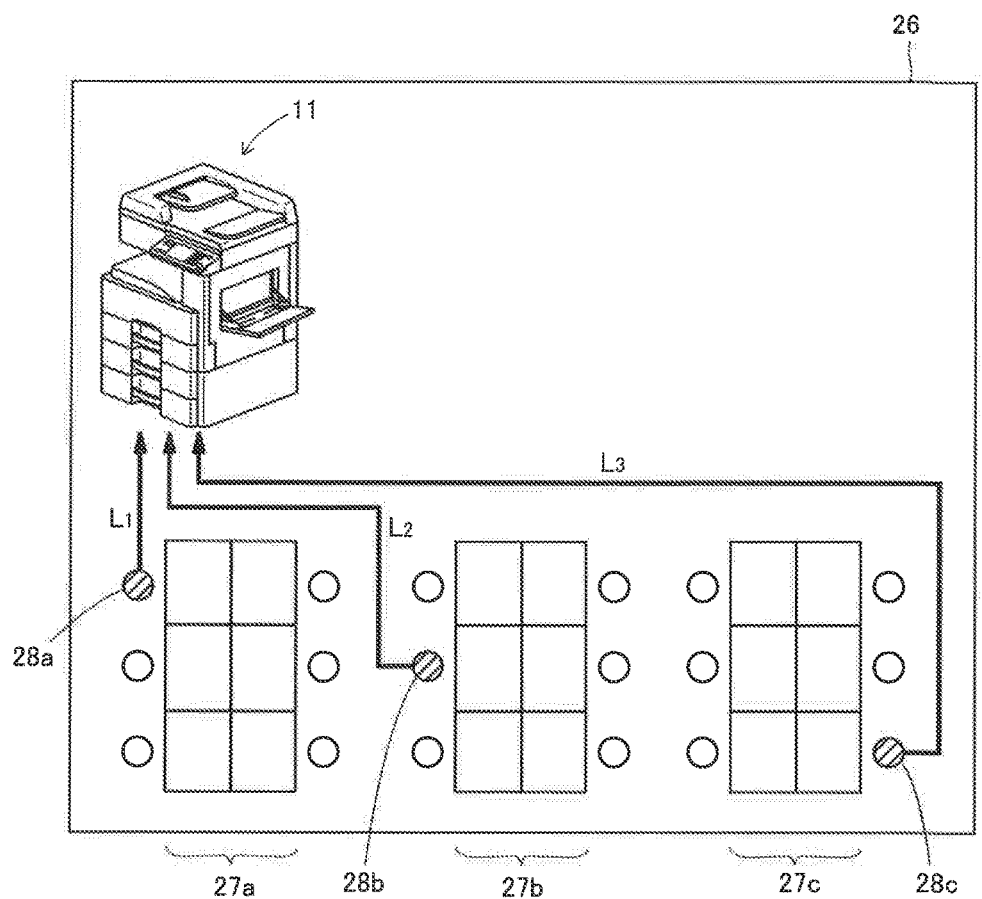
FIG. 3 is a view illustrating an outline of an arrangement configuration of a floor of an office in which a multifunction peripheral illustrated in FIG. 1 is installed.

An embodiment will be described below. FIG. 1 is a schematic view illustrating an outer appearance of an image forming system 24 according to the embodiment. FIG. 2 a block diagram illustrating a configuration of the image forming system 24 illustrated in FIG. 1. FIG. 3 is a view illustrating an outline of an arrangement configuration of a floor of an office 26 in which a multifunction peripheral 11, which is illustrated in FIG. 1, is installed.

With reference to FIG. 1 to FIG. 3, the image forming system 24 includes the multifunction peripheral 11 as an image forming apparatus that is connectable to a network 23 and three mobile terminal devices 31a, 31b, and 31c as a plurality of external devices that are communicable with the multifunction peripheral 11. Note that, in FIG. 2, the image forming system 24 is indicated by an alternate long and short dash line. Each of users owns the corresponding one of the mobile terminal devices 31a, 31b, and 31c and is capable of requesting the multifunction peripheral 11 to perform image forming from the corresponding one of computers 36a, 36b, and 36c that are connectable to the network 23 via the network 23.

First, a configuration of the multifunction peripheral 11 will be described. The multifunction peripheral 11 have a plurality of functions, such as a copy function, a printer function, a facsimile function, or the like, related to image processing. The multifunction peripheral 11 includes a multifunction peripheral control unit 12, an operation unit 13, an image reading unit 14, an image forming unit 15, a paper feeding cassette 16, a hard disk 17, a network interface unit 18 that is used for providing a connection to the network 23, and a multifunction peripheral communication unit 19 as a multifunction peripheral receiving unit.

The multifunction peripheral control unit 12 performs control of the entire multifunction peripheral 11. The operation unit 13 includes a display screen 21 that displays information transmitted from the multifunction peripheral 11 and input contents of a user. The display screen 21 displays information of the multifunction peripheral 11 and also serves as an interface for input. The operation unit 13 causes the user to input conditions, such as the number of print copies, gradation, or the like, for image forming, and on or off of a power supply source. The image reading unit 14 includes an auto document feeder (ADF) 22 as a document conveyance device that conveys a document set in a set position to a reading position. The image reading unit 14 reads out an image of the document set on the ADF 22 or a mounting table (not illustrated). As the paper feeding cassette 16, a plurality of paper feeding cassettes 16 is provided and each of the plurality of paper feeding cassettes 16 is capable of storing a plurality of sheets of paper therein. The image forming unit 15 forms an image on a sheet of paper that has been conveyed from the paper feeding cassettes 16, based on image data read by the image reading unit 14 or image data acquired via the network 23. The hard disk 17 stores the transmitted image data, the input image forming conditions, or the like. The multifunction peripheral communication unit 19 is an interface used for providing a connection to each of the mobile terminal devices 31a, 31b, and 31c.

The multifunction peripheral 11 is configured such that a setting related to image forming is variable. In this case, the setting related to image forming includes a setting of the speed of image forming, a setting of expendables related to image forming, and a setting of power consumption of the multifunction peripheral 11. That is, the multifunction peripheral 11 is capable of changing the setting of the speed of image forming, the setting of expendables related to image forming, and the setting of power consumption of the multifunction peripheral 11. The multifunction peripheral 11 is capable of performing adjustment of the variable setting related to image forming.

The multifunction peripheral 11 is installed in a corner of the office 26. The multifunction peripheral 11 is used by a plurality of users who have desks in the office 26. A user X1 that is a first user owns the mobile terminal device 31a. A desk 28a of the user X1 is placed in the closest location to the multifunction peripheral 11 in an area 27a in which a group of desks, which is the closest to the multifunction peripheral 11, is placed. A distance L1 from a place in which the multifunction peripheral 11 is installed to the location of the desk 28a of the user X1 is 5 m (meter). A user X2 that is a second user owns the mobile terminal device 31b. A desk 28b of the user X2 is placed in the second closest location to the multifunction peripheral 11 in an area 27b in which a group of desks, which is the second closest to the multifunction peripheral 11, is placed. A distance L2 from the place in which the multifunction peripheral 11 is installed to the location of the desk 28b of the user X2 is 10 m. A user X3 that is a third user owns the mobile terminal device 31c. A desk 28c of the user X3 is placed in the most distant location from the multifunction peripheral 11 in an area 27c in which a group of desks, which is the most distant from the multifunction peripheral 11, is placed. A distance L3 from the place in which the multifunction peripheral 11 is installed to the location of the desk 28c of the user X3 is 20 m. Note that, although not illustrated in FIG. 3, the computers 36a, 36b, and 36c, each of which is coupled to the network 23, are installed on the desks 28a, 28b, and 28c, respectively. Each of the users X1, X2, and X3 uses the corresponding one of the computers 36a, 36b, and 36c installed on the desks 28a, 28b, and 28c, respectively, to issue a request for image forming to the multifunction peripheral 11 and thereby performs printing.

Next, a configuration of the computer 36a will be described. Note that a configuration of each of the computers 36b and 36c is similar to the configuration of the computer 36a, and therefore, the description thereof will be omitted. Also, in FIG. 2, illustration of a display, a keyboard, and a mouse, each of which is coupled to the computers 36b and 36c, is omitted.

A display 37, a keyboard 38, and a mouse 39 are coupled to the computer 36a. Information or data from the computer 36a is displayed by the display 37. Also, the user X1 inputs data to the computer 36a using the keyboard 38 or the mouse 39. The user X1 that requests for image forming using the multifunction peripheral 11 uses the keyboard 38 and the mouse 39, each of which is coupled to the computer 36a, to issue and transmit a request for image forming with image data for which image forming is requested to the multifunction peripheral 11 via the network 23. In accordance with the received request for image forming, the multifunction peripheral 11 forms an image on a sheet of paper, based on the received image data, prints the image data on the sheet of paper, and outputs the sheet of paper.

Next, a configuration of the mobile terminal device 31a will be described. Note that a configuration of each of the mobile terminal devices 31b and 31c is similar to the configuration of the mobile terminal device 31a, and therefore, the description thereof will be omitted.

The mobile terminal device 31a includes a mobile terminal device control unit 32, a non-volatile memory 33 as a mobile terminal device storage unit, a mobile terminal device communication unit 34 as an external device transmission unit used for providing a connection to the multifunction peripheral 11, and a touch panel 35. The mobile terminal device control unit 32 performs control of the entire mobile terminal device 31a. The non-volatile memory 33 stores image data and various types of data. The touch panel 35 displays information of the mobile terminal device 31a and also serves as an interface for input.

In this case, the mobile terminal device control unit 32 includes a request receiving unit 41 and an inquiry unit 42. The request receiving unit 41 receives a request for adjustment of the setting related to image forming from the user X1. The inquiry unit 42 causes an image forming setting control unit 44, which will be described later, to reflect the adjusted setting related to image forming, and then, after a predetermined time has elapsed, inquires a request for adjustment of the setting related to image forming. For example, each of the request receiving unit 41 and the inquiry unit 42 is realized by an application installed in the mobile terminal device control unit 32. These will be described later.

Figure 4:
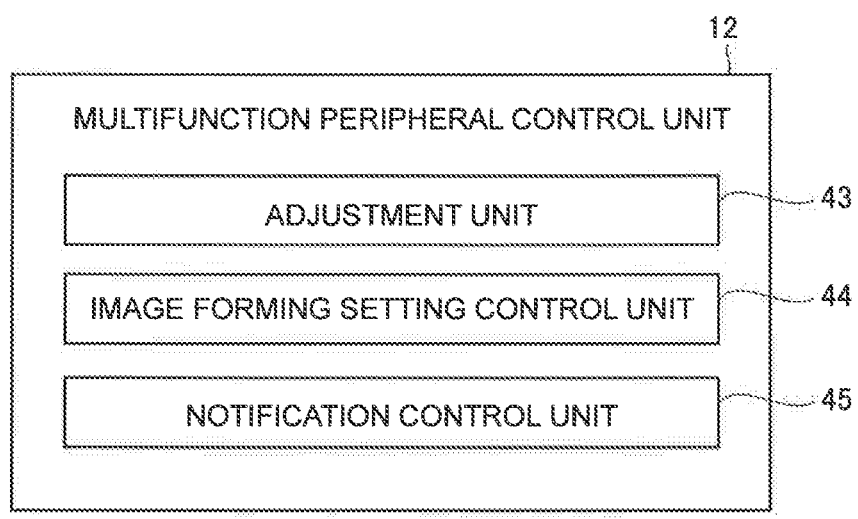
FIG. 4 is a block diagram illustrating a configuration of a multifunction peripheral control unit.

Next, a configuration of the multifunction peripheral control unit 12 will be described. FIG. 4 is a block diagram illustrating a configuration of the multifunction peripheral control unit 12. With reference to FIG. 4, the multifunction peripheral control unit 12 includes an adjustment unit 43, the image forming setting control unit 44, and a notification control unit 45. The adjustment unit 43 adjusts the setting related to image forming, based on a request for adjustment of the setting related to image forming, which has been transmitted from each of the three mobile terminal devices 31a, 31b, and 31c and received by the multifunction peripheral communication unit 19. The image forming setting control unit 44 performs control such that the setting related to image forming, which has been adjusted by the adjustment unit 43, is reflected. The notification control unit 45 performs control such that an adjustment result for the adjusted setting related to image forming, which has been reflected by the image forming setting control unit 44, is notified. Configurations of these components will be described in detail later.

Figure 5:
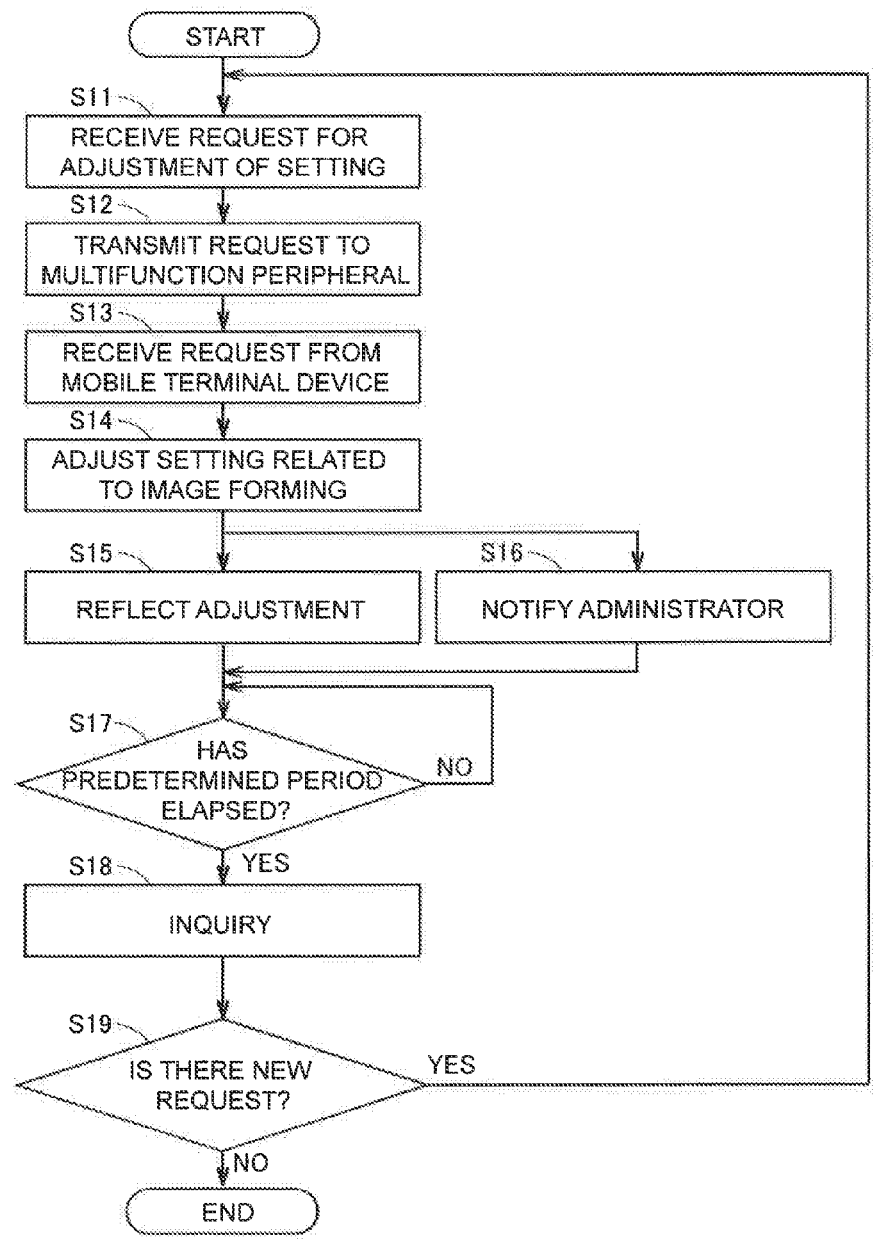
FIG. 5 is a flowchart illustrating a flow of processing when a setting related to image forming is adjusted and reflected using the image forming system illustrated in FIG. 1.

Next, a case where a setting related to image forming is adjusted and is reflected, using the image forming system 24 illustrated in FIG. 1 and FIG. 2 will be described. FIG. 5 is a flowchart illustrating a flow of processing performed when a setting related to image forming is adjusted and is reflected.

With reference to FIG. 1 to FIG. 5, the user X1 requests for adjustment of a setting related to image forming, using the mobile terminal device 31a. In this case, an application related to the request receiving unit 41 is started up. Thus, the request receiving unit 41 displays an exclusive display screen and receives a request for adjustment of a setting related to image forming (in FIG. 5, Step S11, which will be hereinafter referred to as merely as "S11" by omitting "Step").

Figure 6:
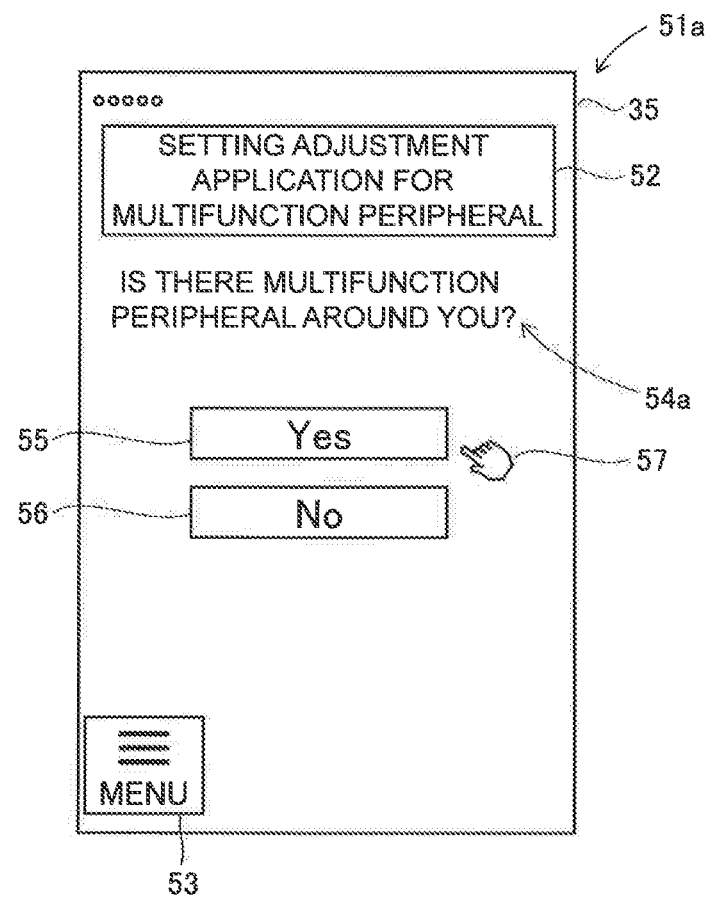
FIG. 6 is a view illustrating an example of a receiving screen.

FIG. 6 is a view illustrating an example of a receiving screen 51a when a request for adjustment of a setting related to image forming is received on the touch panel 35 of the mobile terminal device 31a. With reference to FIG. 6, the receiving screen 51a that receives a request for adjustment of a setting related to image forming is displayed on the touch panel 35. A character representation 52 "SETTING ADJUSTMENT APPLICATION FOR MULTIFUNCTION PERIPHERAL", a character representation 53 "MENU" that is tapped to cause various setting screens to be displayed, a representation 54a of an inquiry asking "IS THERE MULTIFUNCTION PERIPHERAL AROUND YOU?", a selection key 55 on which "Yes" is indicated and which is tapped to select "yes" as an answer to the representation 54a, a selection key 56 on which "No" is indicated and which is tapped to select "no" as an answer to the representation 54a, and a graphic presentation 57 representing a cursor by a graphic image of a finger are displayed on the receiving screen 51a. The user X1 starts up an application that causes the receiving screen 51a to be displayed in the mobile terminal device 31a and taps the selection key 55 or 56 to respond to the inquiry of the representation 54a.

When the request receiving unit 41 detects a tap on the selection key 55 or 56, the request receiving unit 41 displays a next receiving screen 51b on the touch panel 35.

Figure 7:
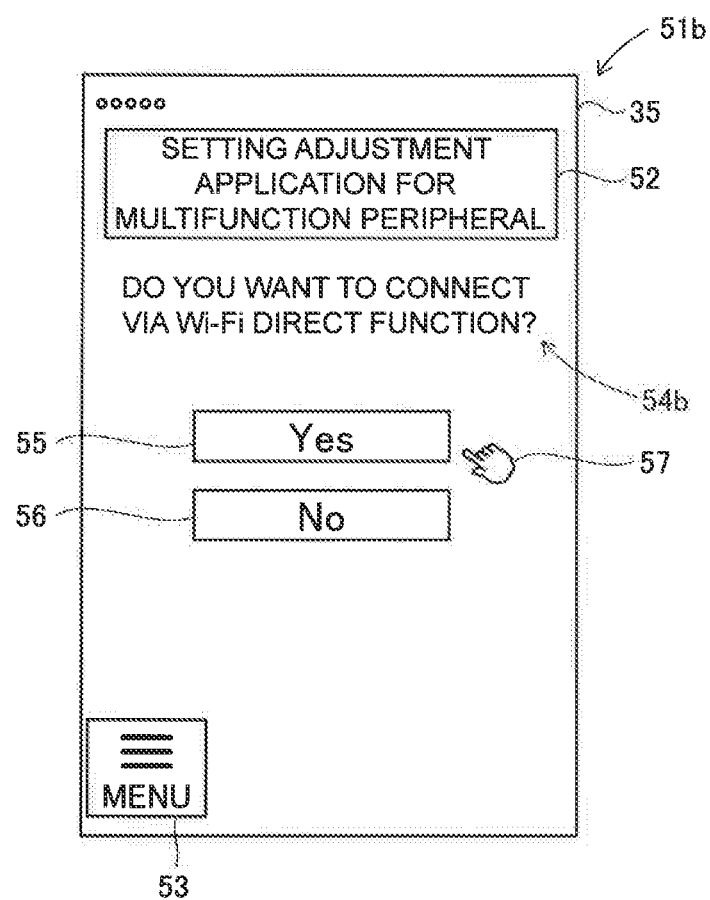
FIG. 7 is a view illustrating an example of a receiving screen.

FIG. 7 is a view illustrating an example of a receiving screen 51b in the above-described case. With reference to FIG. 7, the representations 52, 53, and 57, a representation 54b of an inquiry asking "DO YOU WANT TO CONNECT VIA Wi-Fi DIRECT FUNCTION?", the selection key 55 on which "Yes" is indicated and which is tapped to select "yes" as an answer to the representation 54b, the selection key 56 on which "No" is indicated and which is tapped to select "no" as an answer to the representation 54b, and the graphic presentation 57 representing a cursor by a graphic image of a finger are displayed on the receiving screen 51b.

The user X1 taps the selection key 55 to select "Yes". Then, a wireless connection with the multifunction peripheral 11 is established via a Wi-Fi direct connection. A connection between the multifunction peripheral 11 and the mobile terminal device 31a in this case is a connection by a direct communication via Wi-Fi established between the multifunction peripheral communication unit 19 and the mobile terminal device communication unit 34.

Figure 8:
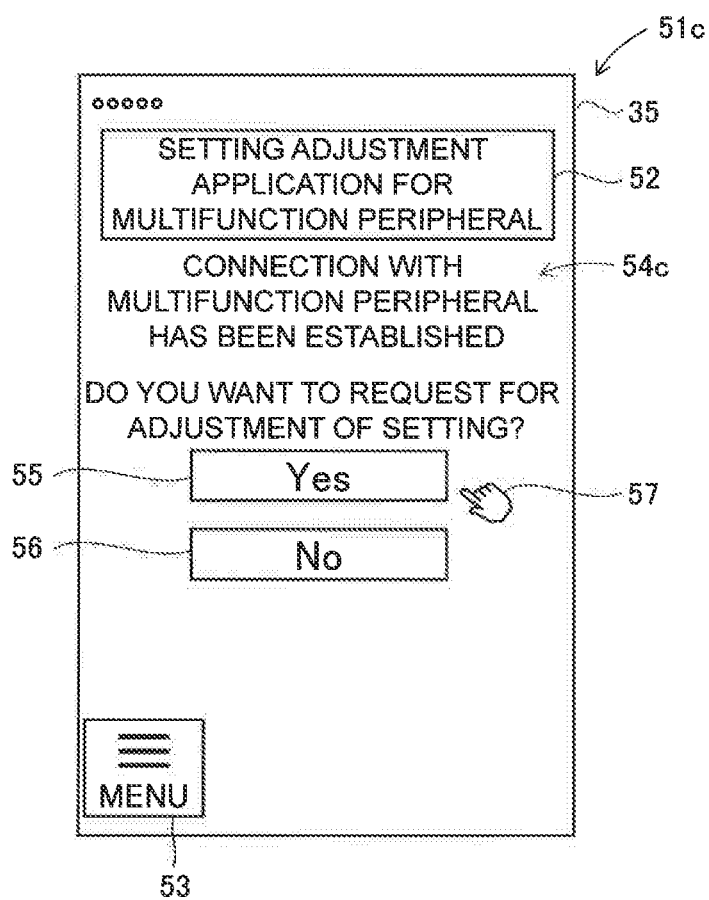
FIG. 8 is a view illustrating an example of a receiving screen.

After a communication is established and the multifunction peripheral 11 and the mobile terminal device 31a are coupled to one another, a screen that receives a request for adjustment of the setting related to image forming is displayed. FIG. 8 is a view illustrating an example of a receiving screen 51c in this case. With reference to FIG. 8, the representations 52, 53, and 57, a representation 54c of an inquiry saying that "CONNECTION WITH MULTIFUNCTION PERIPHERAL HAS BEEN ESTABLISHED. DO YOU WANT TO REQUEST FOR ADJUSTMENT OF SETTING?", and the selection keys 55 and 56 are displayed on the receiving screen 51c. The user X1 taps the selection key 55 to request for adjustment of the setting related to image forming. Then, first, information of the user X1 is checked. As the information of the user X1, information including the name thereof and a distance from the desk 28a to the multifunction peripheral 11 is used. The information of the user X1 is registered by the user in advance and is stored in the non-volatile memory 33. Note that the information of the distance is used as a distance parameter that indicates a distance from the place in which the multifunction peripheral 11 is installed to the location of the desk 28a of the user X1 when adjustment by the adjustment unit 43 is performed.

Figure 9:
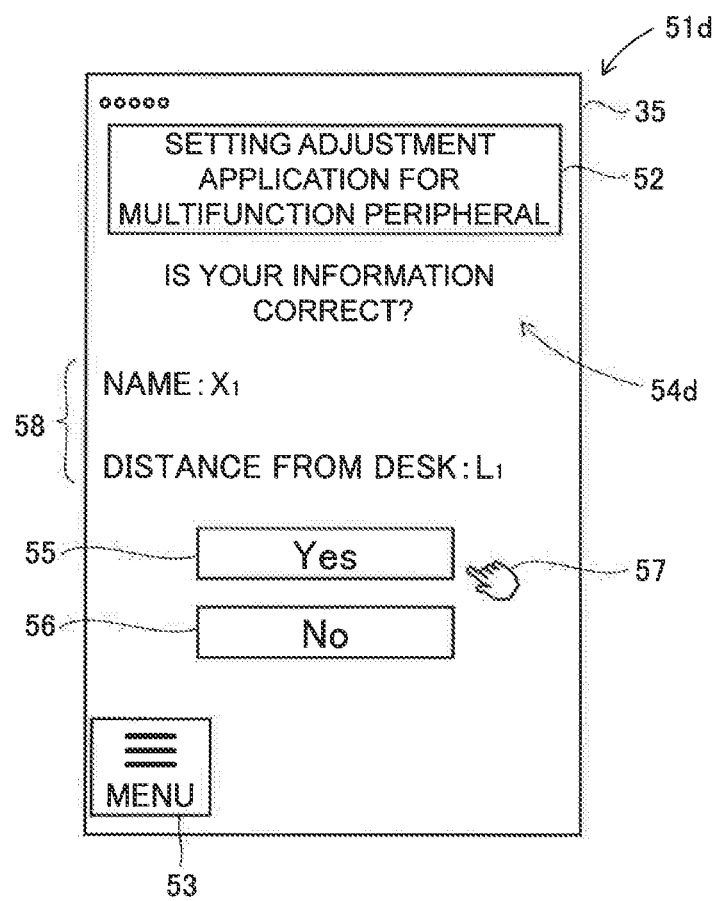
FIG. 9 is a view illustrating an example of a confirmation screen.

FIG. 9 is a view illustrating an example of a confirmation screen 51d that is used when the information of a user is checked. With reference to FIG. 9, the representations 52, 53, and 57, a representation 54d of an inquiry asking "IS YOUR INFORMATION CORRECT?", the selection keys 55 and 56, and a representation 58 "NAME: X1 DISTANCE FROM DESK: L1" are displayed on the confirmation screen 51d. The user X1 taps the selection key 55 after confirming that the contents of the representation 58 are correct. Then, a receiving screen 51e that receives details of the setting related to image forming is displayed. Note that, if the contents of the representation 58 are wrong, the user X1 taps the selection key 56 and inputs correct information in a screen to which the receiving screen 51e is switched thereafter.

Figure 10:
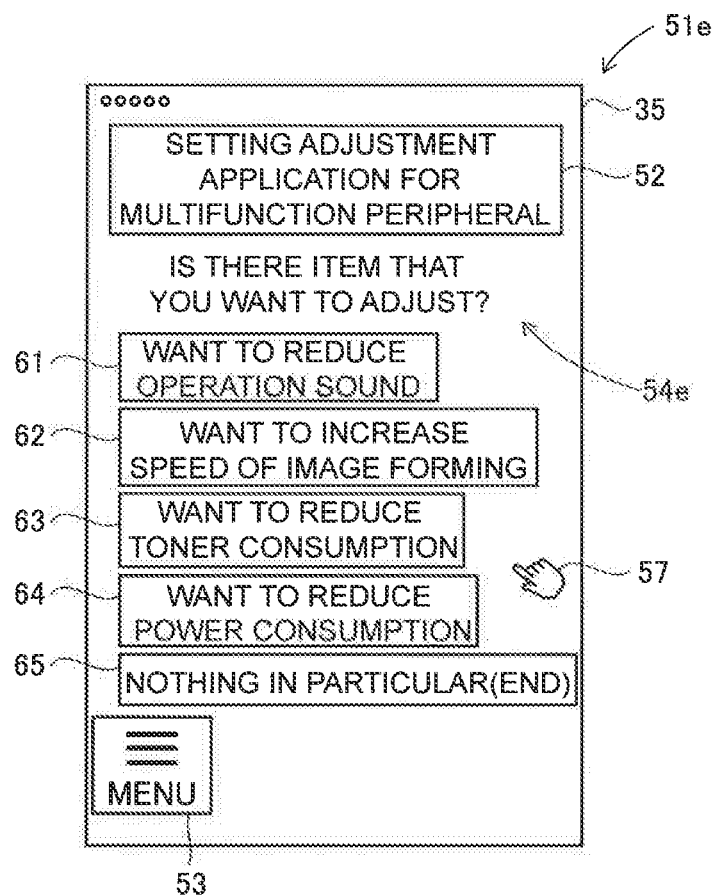
FIG. 10 is a view illustrating an example of a receiving screen.

FIG. 10 is a view illustrating an example of the receiving screen 51e when the selection key 55 is tapped. With reference to FIG. 10, the representations 52, 53, and 57, a representation 54e of an inquiry asking "IS THERE ITEM THAT YOU WANT TO ADJUST?", a selection key 61 on which "WANT TO REDUCE OPERATION SOUND" is indicated and which is tapped to cause the receiving screen 51e to be switched to a screen in which a request for adjustment for reduction of the operation sound of the multifunction peripheral 11 is input, a selection key 62 on which "WANT TO INCREASE SPEED OF IMAGE FORMING" is indicated and which is tapped to cause the receiving screen 51e to be switched to a screen in which a request for adjustment for increase in speed of image forming performed by the image forming unit 15 is input, a selection key 63 on which "WANT TO REDUCE TONER CONSUMPTION" is indicated and which is tapped to cause the receiving screen 51e to be switched to a screen in which a request for adjustment for reduction of the consumption of a toner used by the image forming unit 15 is input, a selection key 64 on which "WANT TO REDUCE POWER CONSUMPTION" is indicated and which is tapped to cause the receiving screen 51e to be switched to a screen in which a request for adjustment for reduction of the consumption of electricity used by the multifunction peripheral 11 is input, and a selection key 65 on which "NOTHING IN PARTICULAR (END)" is indicated and which is tapped to terminate setting are displayed on the receiving screen 51e.

The user X1 taps one of the selection keys 61 to 65 in accordance with a request. In this case, assume that the selection key 61 is tapped by the user X1. Then, a receiving screen in which a request for adjustment of operation sound is input is displayed on the touch panel 35.

Figure 11:
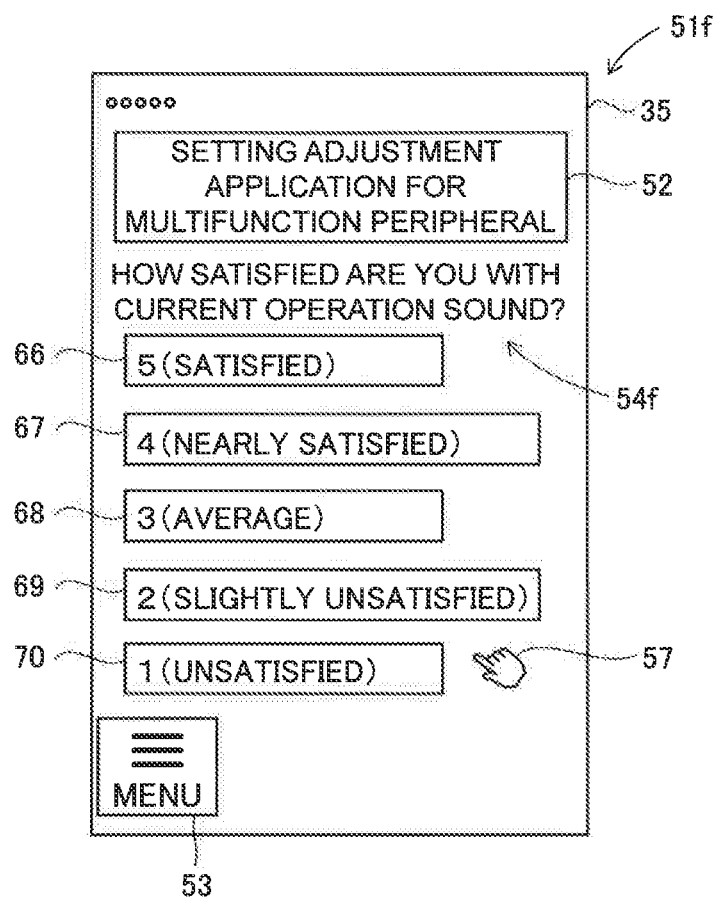
FIG. 11 is a view illustrating an example of a receiving screen.

FIG. 11 is a view illustrating an example of a receiving screen 51f in this case. With reference to FIG. 11, the representations 52, 53, and 57, a representation 54f of an inquiry asking "HOW SATISFIED ARE YOU WITH CURRENT OPERATION SOUND?", a selection key 66 on which "5 (SATISFIED)" is indicated and which the user may tap to input the degree of satisfaction, that is, 5 (SATISFIED), a selection key 67 on which "4 (NEARLY SATISFIED)" is indicated and which the user may tap to input the degree of satisfaction, that is, 4 (NEARLY SATISFIED), a selection key 68 on which "3 (AVERAGE)" is indicated and which the user may tap to input the degree of satisfaction, that is, 3 (AVERAGE), a selection key 69 on which "2 (SLIGHTLY UNSATISFIED)" is indicated and which the user may tap to input the degree of satisfaction, that is, 2 (SLIGHTLY UNSATISFIED), and a selection key 70 on which "1 (UNSATISFIED)" is indicated and which the user may tap to input the degree of satisfaction, that is, 1 (UNSATISFIED), are displayed on the inquiry representation 54f.

Now assume that the user X1 sits at the desk very close to the multifunction peripheral 11, and therefore, the user X1 is very bothered by the operation sound. Therefore, for example, the user X1 taps the selection key 70 to input "1 (SLIGHTLY UNSATISFIED)". Thus, the request for adjustment is input. Note that the degree of satisfaction that has been input at this point is used as a degree-of-satisfaction parameter that indicates the degree of satisfaction about the operation sound of the multifunction peripheral 11 when adjustment by the adjustment unit 43 is performed.

Figure 12:
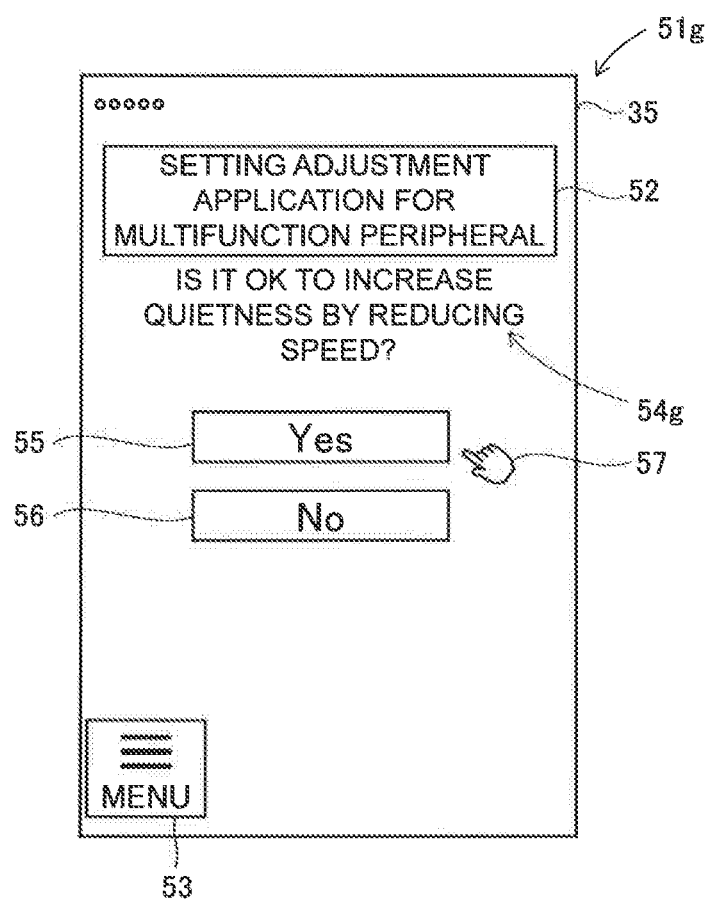
FIG. 12 is a view illustrating an example of an inquiry screen.

Thereafter, the receiving screen 51f is switched to a next screen. FIG. 12 is a view illustrating an example of an inquiry screen 51g that inquires whether or not a user wants to request for a change. With reference to FIG. 12, the representations 52, 53, and 57, a representation 54g of an inquiry asking "IS IT OK TO INCREASE QUIETNESS BY REDUCING SPEED?", and the selection keys 55 and 56 are displayed on the inquiry screen 51g.

The user X1 taps one of the selection keys 55 and 56. Thus, the receiving screen 51e illustrated in FIG. 10 is displayed again. Then, when the setting of a request for adjustment ends, the selection key 65 is tapped.

Figure 13:
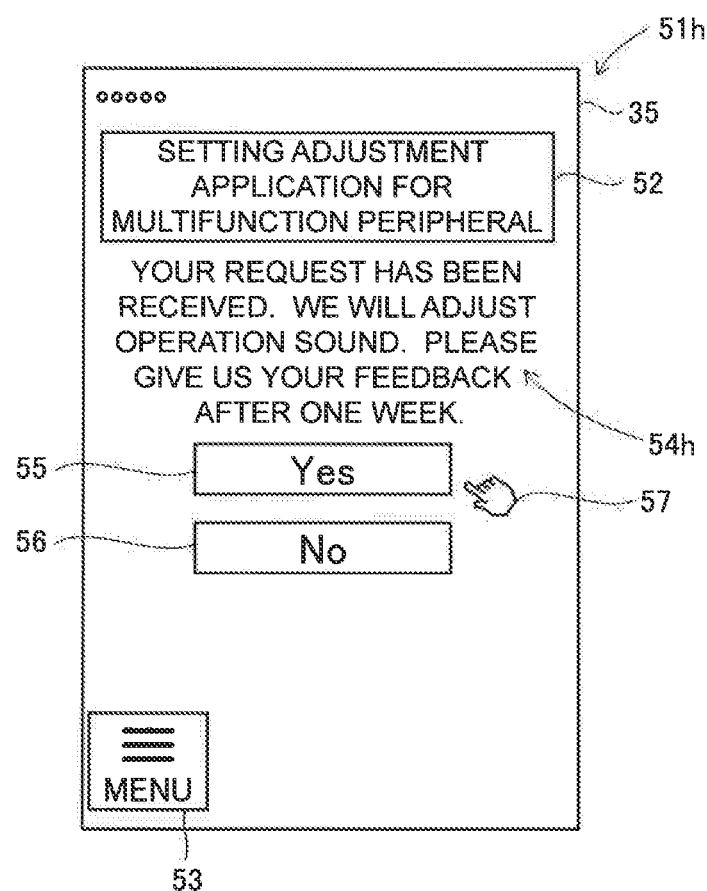
FIG. 13 is a view illustrating an example of a confirmation screen.

Thereafter, a final check screen is displayed. FIG. 13 is a view illustrating an example of a confirmation screen 51h in this case. With reference to FIG. 13, the representations 52, 53, and 57, a representation 54h saying "YOUR REQUEST HAS BEEN RECEIVED. WE WILL ADJUST OPERATION SOUND. SO PLEASE GIVE US YOUR FEEDBACK AFTER ONE WEEK.", and the selection keys 55 and 56 are displayed on the confirmation screen 51h.

If the user X1 makes a further request after one week, the user X1 taps the selection key 55 and, if the user X1 does not make a further request after one week, the user X1 taps the selection key 56. Thus, the user X1 terminates input of a request.

Figure 14:
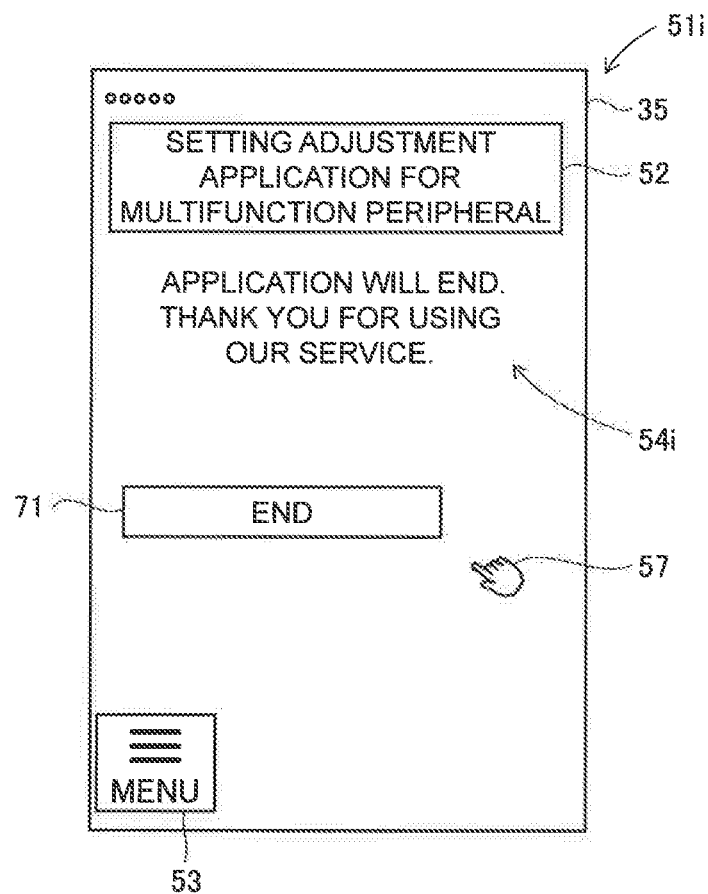
FIG. 14 is a view illustrating an example of a guidance screen.

Then, as illustrated in FIG. 14, a final guidance screen 51i is displayed. FIG. 14 is a view illustrating an example of the final guidance screen 51i. With reference to FIG. 14, the representations 52, 53, and 57, a representation 54i saying "APPLICATION WILL END. THANK YOU FOR USING OUR SERVICE.", and a selection key 71 on which "END" is indicated and which is tapped to end the application are displayed on the guidance screen 51i. The user X1 taps the selection key 71. When the request receiving unit 41 detects a tap on the selection key 71, the request receiving unit 41 terminates reception of a request.

Thereafter, the received request is transmitted to the multifunction peripheral 11 (S12). The multifunction peripheral 11 receives the request transmitted from the mobile terminal device 31a (S13). Then, the adjustment unit 43 adjusts the setting related to image forming (S14).

Adjustment performed by the adjustment unit 43 will be described below. The adjustment unit 43 adjusts the setting related to image forming in accordance with a parameter. As the parameter, for example, the distance parameter that indicates the distance from the place in which the multifunction peripheral 11 is installed to the location of the desk 28a of the user X1 or the degree-of-satisfaction parameter that indicates the degree of satisfaction about the operation sound of the multifunction peripheral 11. The distance parameter is 5 merely in accordance with the distance and the degree-of-satisfaction parameter is 1.

In this case, the adjustment unit 43 adjusts the setting related to image forming in accordance with a calculation value calculated by multiplying the distance parameter by a value obtained by quantifying the degree-of-satisfaction parameter in accordance with a several-number grading scale. Specifically, a numerical value "5", obtained by multiplying the distance parameter "5" by the degree-of-satisfaction parameter "1", is the level of request of the user X1 about the operation sound. As for the level of request, the lower the numerical value is, the higher the level of request becomes. The level of request is also calculated from the user X2 and the user X3. Thereafter, in accordance with the level of request of each user which has been obtained, the speed of image forming is adjusted.

Then, the image forming setting control unit 44 performs control such that the setting related to image forming that has been adjusted by the adjustment unit 43 is reflected (S15). In this case, in accordance with the level of request, for example, the speed of image forming is set low. Note that, when the speed of image forming is set low, the operation sound is reduced but, time for which the user X1 waits for an output object to be output is increased accordingly. Also, for the user X2 and the user X3, who hardly had waited for an output object to be output by then, cases where the user X2 of the user X3 has to wait for an output object to be output increase.

Note that, in this case, the notification control unit 45 performs control such that, for example, the user X2 that is an administrator is notified of an adjustment result for the adjusted setting related to image forming that has been reflected by the image forming setting control unit 44 (S16). In this case, for example, the mobile terminal device 31*b* is notified of the adjustment result from the multifunction peripheral 11 via an e-mail. Then, adjustment of setting related to image forming temporarily ends.

When a predetermined period has elapsed (YES in S17), the inquiry unit 42 inquires the mobile terminal device 31*a* of a request for the setting related to image forming, which has been reflected by the image forming setting control unit 44 (S18). This setting is a setting in a case where the selection key 55 is tapped in FIG. 13. That is, for the setting related to image forming, which has been adjusted, a one-week test period has been given as the predetermined period.

If there is a new request (YES in S19), the process returns to S11 again and a request for a setting related to image forming is received. Specifically, if the user X1 is still bothered by the operation sound, the user X1 makes a request indicating that the user X1 is slightly unsatisfied. Also, when the speed of image forming is too slow and the user X3 feels unsatisfied, the user X3 makes a request about this point. One the other hand, if there is not a new request (NO in S19), the process ends. That is, adjustment of the setting related to image forming ends.

With the above-described image forming system 24, a request for a setting related to image forming is received via the plurality of mobile terminal devices 31*a*, 31*b*, and 31*c*, the setting related to image forming is adjusted by the adjustment unit 43, based on the request for the setting related to image forming, and the setting related to image forming, which has been adjusted, is reflected. Thus, based on requests of the plurality of users, each of which has been received by the corresponding one of the mobile terminal device 31*a*, 31*b*, and 31*c*, the setting related to image forming may be adjusted. In this case, an additional work is not required for adjustment and also complications are not caused by adjustment. Thus, the image forming system 24 may easily and properly construct an environment in which the plurality of users can comfortably use the multifunction peripheral 11.

In this case, the request receiving unit 41 receives a request for a plurality of parameters for the setting related to image forming. Then, the adjustment unit 43 adjusts the setting related to image forming in accordance with the parameters. Thus, the setting related to image forming may be more objectively adjusted.

Also, in this case, the adjustment unit 43 adjusts the setting related to image forming in accordance with the calculation value calculated by multiplying the distance parameter by the value obtained by quantifying the degree-of-satisfaction parameter in accordance with the several-number grading scale, and therefore, the settings related to the operation sound and the speed of image forming may be more properly adjusted.

Also, in this case, the notification control unit 45 having the above-described configuration is included, and therefore, management of the setting related to image forming may be smoothly performed by the administrator. Also, in this case, the inquiry unit 42 having the above-described configuration is included, and therefore, adjustment of the setting related to image forming may be performed in accordance with users' demands.

Note that, although, in the above-described description, the setting related to image forming includes a setting of the speed of image forming, a setting of expendables related to image forming, and a setting of power consumption of the mage forming device, the setting related to image forming is not limited thereto, but may include at least one of a setting of the speed of image forming, a setting of expendables related to image forming, and a setting of power consumption of the mage forming device.

Note that, although the adjustment unit 43 adjusts the setting related to image forming in accordance with the calculation value calculated by multiplying the distance parameter by the value obtained by quantifying the degree-of-satisfaction parameter in accordance with the several-number grading scale, the adjustment unit 43 is not limited thereto but may be configured to perform a suitable arithmetic operation or the like to adjust the setting related to image forming, using other parameters.

Note that, although, in the above-described embodiment, a request for the setting related to image forming is received by the mobile terminal devices 31*a*, 31*b*, and 31*c*, reception of a request for the setting related to image forming is not limited thereto but a configuration in which, using the computers 36*a*, 36*b*, and 36*c* as external devices, a request is received from the computers 36*a*, 36*b*, and 36*c* may be employed. That is, a configuration in which the external device is at least one of the mobile terminal devices 31*a*, 31*b*, and 31*c* owned by the users and the computers 36*a*, 36*b*, and 36*c* may be employed.

Note that the inquiry unit 42 and the notification control unit 45 that have been described above may be omitted.

The embodiment disclosed herein is provided merely for illustrative purpose in every respect and is not intended to be limiting in any aspect. The scope of the present disclosure is defined by the scope of claims rather than the above-described description, and is intended to include any modifications within the scope of claims and the meaning equivalent to the terms of the claims.

An image forming system according to the present disclosure is effectively used specifically when easy and proper construction of an environment in which a plurality of users can comfortably use an image forming apparatus is required.

What is claimed is:

1. An image forming system comprising:
an image forming apparatus in which a setting related to image forming is variable, and
a plurality of external devices that are communicable with the image forming apparatus,
wherein each of the external devices includes
a request receiving unit configured to receive a request for adjustment of the setting related to image forming from a user, and
an external device transmission unit configured to transmit the request for adjustment of the setting related to image forming, which has been received by the request receiving unit to the image forming apparatus, and
the image forming apparatus includes
an image forming unit configured to form an image,
an image forming apparatus receiving unit configured to receive requests for adjustment of the setting related to image forming, which have been transmitted from the plurality of external device transmission units,
an adjustment unit configured to adjust, based on the plurality of requests for adjustment of the setting related to image forming, which have been received by the image forming apparatus receiving unit, the setting related to image forming, and
an image forming setting control unit configured to perform control such that the setting related to image forming, which has been adjusted by the adjustment unit, is reflected,
wherein the request receiving unit receives requests for a plurality of parameters for the setting related to image forming,
the adjustment unit adjusts the setting related to image forming in accordance with the parameters, and
the plurality of parameters include at least one of a distance parameter that indicates a distance from a place in which the image forming apparatus is installed to a location of a desk of the user and a degree-of-satisfaction parameter that indicates the degree of satisfaction about the operation sound of the image forming apparatus.

2. The image forming system according to claim 1,
wherein the setting related to image forming includes at least one of a setting of the speed of the image forming, a setting of expendables related to the image forming, and a setting of power consumption of the image forming apparatus.

3. The image forming system according to claim 1,
wherein the adjustment unit adjusts the setting related to image forming in accordance with a calculation value calculated by multiplying the distance parameter by a value obtained by quantifying the degree-of-satisfaction parameter in accordance with a several-number grading scale.

4. The image forming system according to claim 1,
wherein the external device is at least one of a mobile terminal device owned by the user and a computer owned by the user.

5. The image forming system according to claim 1,
wherein the external device further includes
an inquiry unit configured to inquire the external unit of a request for adjustment of the setting related to image forming after a predetermined period has elapsed since the setting related to image forming, which have been adjusted, is reflected by the image forming setting control unit.

6. The image forming system according to claim 1, further comprising:
a notification control unit configured to perform control such that an adjustment result for the adjusted setting related to image forming, which has been reflected by the image forming setting control unit, is notified.

* * * * *